(12) United States Patent
Takano et al.

(10) Patent No.: US 9,404,169 B2
(45) Date of Patent: Aug. 2, 2016

(54) METHOD FOR RECOVERING SCANDIUM

(71) Applicants: SUMITOMO METAL MINING CO., LTD., Tokyo (JP); Kyushu University, National University Corporation, Fukuoka-Shi (JP)

(72) Inventors: Masatoshi Takano, Niihama (JP); Yoshitomo Ozaki, Niihama (JP); Satoshi Asano, Niihama (JP); Masahiro Goto, Fukuoka (JP); Fukiko Kubota, Fukuoka (JP); Yuzo Baba, Fukuoka (JP)

(73) Assignees: SUMITOMO METAL MINING CO., LTD., Tokyo (JP); Kyushu University, National University Corporation, Fukuoka-shi (JP)

( * ) Notice: Subject to any disclaimer, the term of this patent is extended or adjusted under 35 U.S.C. 154(b) by 0 days.

(21) Appl. No.: 14/437,466

(22) PCT Filed: Apr. 8, 2014

(86) PCT No.: PCT/JP2014/060149
§ 371 (c)(1),
(2) Date: Apr. 21, 2015

(87) PCT Pub. No.: WO2015/025558
PCT Pub. Date: Feb. 26, 2015

(65) Prior Publication Data
US 2015/0284821 A1    Oct. 8, 2015

(30) Foreign Application Priority Data

Aug. 22, 2013  (JP) .................. 2013-172261

(51) Int. Cl.
| | |
|---|---|
| *C22B 59/00* | (2006.01) |
| *B01J 20/22* | (2006.01) |
| *C22B 3/24* | (2006.01) |
| *C22B 3/42* | (2006.01) |
| *B01J 20/26* | (2006.01) |
| *C22B 7/00* | (2006.01) |

(52) U.S. Cl.
CPC ............. *C22B 59/00* (2013.01); *B01J 20/22* (2013.01); *B01J 20/26* (2013.01); *C22B 3/24* (2013.01); *C22B 3/42* (2013.01); *C22B 7/005* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 8,951,486 B2 * | 2/2015 | Goto et al. | 423/21.5 |
| 9,011,804 B2 * | 4/2015 | Goto et al. | 423/150.1 |
| 2014/0328737 A1 | 11/2014 | Goto et al. | |

FOREIGN PATENT DOCUMENTS

| | | |
|---|---|---|
| JP | H01246328 A | 10/1989 |
| JP | H071003171 A | 4/1995 |
| JP | H09176756 A | 7/1997 |
| JP | H-09-291320 A | 11/1997 |
| JP | 2000313928 A | 11/2000 |
| JP | 2007-327085 A | 12/2007 |
| JP | WO-2013069562 A1 | 5/2013 |

OTHER PUBLICATIONS

International Search Report of PCT/JP2014/060149, dated Jun. 27, 2014.

* cited by examiner

*Primary Examiner* — Steven Bos
(74) *Attorney, Agent, or Firm* — Locke Lord LLP

(57) ABSTRACT

To efficiently and selectively recover scandium from an acid solution containing calcium, magnesium and scandium. In the present invention, an acid solution containing calcium, magnesium and scandium is brought into contact with a scandium recovering resin impregnated with an amide derivative represented by the following general formula for an hour or more. In the formula, $R^1$ and $R^2$ each represent the same or different alkyl groups. The alkyl group can be a straight chain or a branched chain. $R^3$ represents a hydrogen atom or an alkyl group. $R^4$ represents a hydrogen atom or any group other than an amino group, which is bound to the α carbon as an amino acid. The amide derivative is preferably any one or more of glycinamide derivatives, histidinamide derivatives, lysinamide derivatives and aspartic acid amide derivatives.

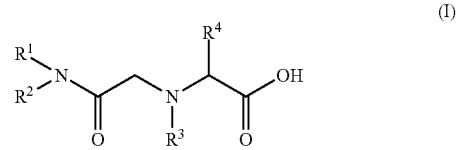

2 Claims, 1 Drawing Sheet

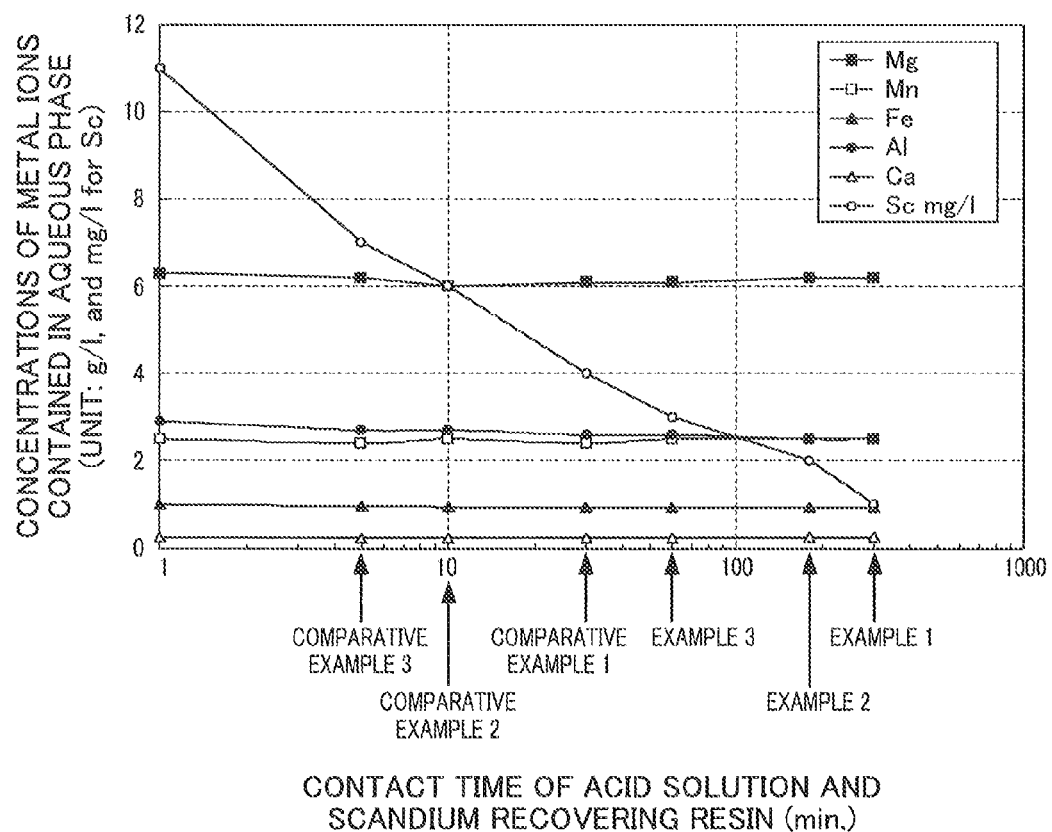

METHOD FOR RECOVERING SCANDIUM

CROSS-REFERENCE TO RELATED APPLICATIONS

This application is the national phase tinder 35 U.S.C. §371 of PCT International Application No. PCT/JP2014/060149, filed Apr. 8, 2014, which claims the benefit of Japanese Application No. 2013-172261, filed Aug. 22, 2013, the entire contents of the aforementioned applications are hereby incorporated herein by reference.

TECHNICAL FIELD

The present invention relates to a method for recovering scandium.

BACKGROUND ART

Scandium has the lowest atomic number among the rare earth elements and is used as a material for metal halide lamps, an additional element in alloys, an additional element in catalytic ceramics, and the like. However, scandium is expensive and has limited output, and further separation and purification are difficult. The use of scandium has been therefore limited.

It is incidentally known that nickel oxide ores, such as laterite ore, contain minute amounts of scandium. Scandium contained in nickel oxide ores can be recovered, for example, from a leachate obtained by the addition of sulfuric acid to a nickel oxide ore and then pressure leaching.

In Patent Document 1, for example, it is shown that nickel and scandium can be recovered from an oxide mineral by (a) the leaching step of obtaining a leachate containing nickel and scandium by the leaching of the oxide mineral with an acid under high temperature and high pressure, (b) a first neutralization step of removing iron and aluminum in the leachate as precipitates by adding a neutralizer to the leachate to adjust the pH to a range of 2 to 4, (c) a second neutralization step of, by adding a neutralizer to the solution after precipitates are removed in the first neutralization step to adjust the pH to a range of more than 4 to 7.5, recovering scandium in the solution as precipitates, and (d) a third neutralization step of recovering nickel in the solution as precipitates by further adding a neutralizer thereto to adjust the pH to more than 7.5.

In Patent Document 2, it is shown that high purity scandium oxide is obtained by adding an organic solvent to an aqueous phase scandium-containing solution containing at least one or more of iron, aluminum, calcium, yttrium, manganese, chromium and magnesium along with scandium to extract scandium components into the organic solvent, then, in order to separate the minor components extracted with scandium in the organic solvent, by carrying out scrubbing by adding an aqueous solution of hydrochloric acid thereto to remove the minor components, followed by adding an aqueous solution of sodium hydroxide to the organic solvent to change the scandium remaining in the organic solvent into a $Sc(OH)_3$-containing slurry, dissolving $Sc(OH)_3$ obtained by filtering this slurry in hydrochloric acid to obtain an aqueous solution of scandium chloride, adding oxalic acid to this to obtain scandium oxalate precipitates, filtering the precipitates to separate minute amounts of impurities to the filtrate, and then calcining the precipitates.

Patent Document 3 discloses an extraction agent, which has a diglycol amic acid backbone and is called DODGAA. This extraction agent is characterized by having very low solubility in water, being able to be completely disposed of by incineration, having the excellent rare earth metal extraction ability and selective separation ability which are equal to those of existing phosphorus-based compounds, and having low synthesis costs.

The solutions in Patent Documents 1 to 3 are all carried out by solvent extraction. Incidentally, the recovery of metals using ion exchange resins is widely used as well as that using solvent extraction. Unlike solvent extraction, solid extraction agents such as ion exchange resins and chelate resins have advantages of being able to be handled in a physically stable state and operated by a simple device. The reaction by ion exchange, unlike the above solvent extraction method, has less physical motion, for example, mixing an extraction agent and a solution. Contact between an ion exchange resin and a solution is generally carried out in a sealed column in many cases, and thus the capture of e.g. air is prevented. Consequently, the reaction is also characterized in that crud formation is suppressed and operations are stably carried out.

In Patent Document 4, a method for recovering scandium using a chelate resin is shown as an example of scandium recovery using a solid extraction agent. This method is a method for producing high purity scandium oxide, comprising the leaching step of obtaining a scandium-containing solution from an oxide containing minute amounts of scandium, the liquid adjusting step, the extraction step of forming a chelate resin which has adsorbed scandium, the washing step of washing the scandium-adsorbing chelate resin with a dilute acid, the back extraction step of obtaining a scandium-containing solution by eluting the scandium-adsorbing chelate resin with a strong acid, the precipitation step of obtaining scandium precipitates from the scandium-containing solution using a precipitant, and the step of calcining the precipitates.

In Patent Document 5, it is also shown that scandium is recovered using a resin impregnated with alkyl phosphonic acid or alkyl phosphoric acid ester, an extraction agent.

Patent Document 1: Japanese Unexamined Patent Application, Publication No. 2000-313928

Patent Document 2: Japanese Unexamined Patent Application, Publication No. H09-291320

Patent Document 3: Japanese Unexamined Patent Application, Publication No. 2007-327085

Patent Document 4: Japanese Unexamined Patent Application, Publication No. H09-176756

Patent Document 5: Japanese Unexamined Patent Application, Publication No. H01-246328

DISCLOSURE OF THE INVENTION

Problems to be Solved by the Invention

When the method described in Patent Document 1 is industrially operated, however, various problems occur. For example, because the pH adjustment range in the first neutralization step and the pH adjustment range in the second neutralization step are close, in the first neutralization step, scandium is also precipitated with iron and aluminum, which can cause a decline in the scandium extraction rate, and in the second neutralization step, iron and aluminum are also precipitated with scandium, which can cause a decline in the scandium purity. Both cases are unacceptable. In addition, although large amounts of precipitates are formed by adding a neutralizer, in general, the properties of precipitates obtained by adding an alkali to an acid are unstable and they have poor filterability. Therefore, there is a possibility that the costs for the scale expansion of equipment and the like increase.

When the method in Patent Document 2 is used, not only scandium but also impurity components are extracted into an organic solvent in a measurable amount. In a leachate obtained by acid leaching of a nickel oxide ore and neutralization, in particular, calcium and magnesium, and further impurities such as iron exist in large amounts. Therefore, there is a problem in that scrubbing requires time and involves costs, and furthermore there is also the problem of the disposal of the waste generated by scrubbing. Furthermore, depending on the above impurities, for example, sediment called crud is formed by oxidization with air caught during the extraction operation, and it thus becomes difficult to separate an organic solvent after extraction and a leachate, and there has been a situation in which operations are suspended.

In addition, because the methods described in Patent Documents 1 and 2 are recovery methods using solvent extraction, when industrially operated, for example, a solvent extraction device with a complicated mechanism such as a mixer settler is required. There is also a problem in that, in the case of extraction, it is difficult to flexibly adjust operations, for example, the control of liquid state, shifts in operating load and a temporary suspension.

In addition, because scandium extraction is considerably influenced by pH, even in the case where the extraction agent shown in Patent Document 3 is used, when scandium is extracted, the pH needs to be maintained to be equal to or higher than a fixed value in order to obtain a practical extraction rate. Furthermore, in the pH region suitable for scandium extraction, not only the extraction rate of scandium but also those of calcium and magnesium increase, and thus it is difficult to selectively separate only scandium.

In addition, when using a chelate resin as shown in Patent Document 4, various impurities contained in a nickel oxide ore in large amounts, especially iron ions, chromium ions, aluminum ions and the like are also adsorbed on the chelate resin, and thus adsorption of a minute amount of scandium is easily hindered. Therefore, the step and equipment to separate these impurities are required, and there is a problem in that it is difficult to carry out compact operations.

In addition, because the extraction agent described in Patent Document 5 is the same as the extraction agent described in Patent Document 2, not only scandium but also impurity components are adsorbed in a measurable amount. In particular, in a leachate obtained by acid leaching of a nickel oxide ore and neutralization, calcium, magnesium and the like exist in large amounts. Therefore, although crud generation as described above can be suppressed, there is a problem in that the removal of impurities involves time and costs, and also there is the problem of the disposal of waste generated by removing the impurities. These problems are the same as those in the method described in Patent Document 2.

An object of the present invention is to efficiently and selectively recover scandium from an acid solution containing calcium, magnesium and scandium.

As a result of repeated intensive investigation to solve the above problems, the present inventors found that the above object could be achieved by using a resin impregnated with a specific amide derivative, thereby completing the present invention.

Means for Solving the Problems

Specifically, the present invention provides as follows.

(1) The present invention is a method for recovering scandium in which an acid solution containing calcium, magnesium and scandium is brought into contact with a scandium recovering resin impregnated with an amide derivative represented by the following general formula (I) for an hour or more.

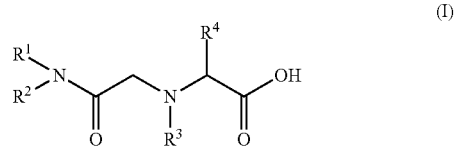

(wherein, $R^1$ and $R^2$ each represent the same or different alkyl groups;

the alkyl group can be a straight chain or a branched chain;

$R^3$ represents a hydrogen atom or an alkyl group; and $R^4$ represents a hydrogen atom or any group other than an amino group, which is bound to the α carbon as an amino acid).

(2) The present invention is also a method for recovering scandium according to (1), wherein the above amide derivative is any one or more of glycinamide derivatives, histidinamide derivatives, lysinamide derivatives and aspartic acid amide derivatives.

(3) The present invention is also a method for recovering scandium according to (1) or (2), wherein the above acid solution is a solution in which nickel is leached by mixing sulfuric acid with a nickel oxide mineral.

Effects of the Invention

According to the present invention, scandium can be efficiently and selectively recovered from an acid solution containing calcium, magnesium and scandium.

BRIEF DESCRIPTION OF THE DRAWINGS

FIG. 1 is a FIGURE showing a relationship between the contact time of an acid solution and a scandium recovering resin and the concentrations of metal ions contained in a post-adsorption Liquid.

PREFERRED MODE FOR CARRYING OUT THE INVENTION

The specific embodiments of the present invention will now be described in detail. It should be noted, however, that the present invention is not restricted to the following embodiments and can be carried out with proper modification within the scope of the object of the invention.

Method for Recovering Scandium

In the present invention, an acid solution containing calcium, magnesium and scandium is brought into contact with a scandium recovering resin impregnated with a specific amide derivative for an hour or more.

[Amide Derivatives]

The above amide derivative is represented by the following general formula (I).

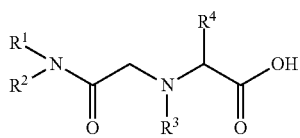
(I)

In the formula, $R^1$ and $R^2$ each represent the same or different alkyl groups. The alkyl group can be a straight chain or a branched chain. $R^3$ represents a hydrogen atom or an alkyl group. $R^4$ represents a hydrogen atom or any group other than an amino group, which is bound to a carbon as an amino acid.

The above amide derivative is preferably any one or more of glycinamide derivatives, histidinamide derivatives, lysinamide derivatives and aspartic acid amide derivatives.

When the amide derivative is a glycinamide derivative, the above glycinamide derivative can be synthesized by the following method. First, a 2-halogenated acetyl halide is added to an alkylamine having a structure represented by $NHR^1R^2$ ($R^1$ and $R^2$ are the same as the above substituents $R^1$ and $R^2$), and the hydrogen atom of amine is substituted with 2-halogenated acetyl by the nucleophilic substitution reaction to obtain 2-halogenated(N,N-di)alkylacetamide.

Next, the above 2-halogenated(N,N-di)alkylacetamide is added to glycine or an N-alkylglycine derivative, and one of the hydrogen atoms of the glycine or N-alkylglycine derivative is substituted with an (N,N-di)alkylacetamide group by the nucleophilic substitution reaction. A glycine alkylamide derivative can be synthesized by the two-step reaction.

A histidinamide derivative, a lysinamide derivative or an aspartic acid amide derivative can be synthesized by substituting glycine with histidine, lysine or aspartic acid.

[Resin]

The use of any resin is not particularly limited as long as it is a porous resin, and examples thereof include an acrylic ester polymer, a styrene polymer and the like. In the description, porousness means to have pores which can be permeated by a solvent. It is preferred for the porous resin to have a high specific surface area so that a large amount of extraction agent can permeate.

[Preparation of Scandium Recovering Resin]

In the present invention, the scandium recovering resin is obtained as follows. First, the above amide derivative is dissolved in a solvent which is easily volatilized, such as toluene, to obtain a low viscous liquid. In this, the above resin is soaked and the solvent is then distilled off. The scandium recovering resin is obtained by performing these steps.

Considering the adsorption ability of scandium ions, it is preferred that the proportion of the amide derivative contained in the scandium recovering resin be higher. However, when the proportion of the amide derivative is too high, the scandium recovering resin becomes viscous, which can influence the handling properties of a scandium recovering device. Considering both the adsorption ability of scandium ions and the handling properties of a scandium recovering device, the weight ratio of materials for a porous resin before impregnation and an amide derivative is preferably from 40:60 or more to 60:40 or less, more preferably from 45:55 or more to 55:45 or less, and particularly preferably almost 50:50.

[Recovery of Scandium]

The recovery of scandium using the above scandium recovering resin is carried out as follows. First, scandium ions are adsorbed on the above scandium recovering resin. Next, scandium ions adsorbed on the scandium recovering resin are recovered using an eluent.

First, the adsorption of scandium ions on a scandium recovering resin will be described. This adsorption is carried out by preparing an acid solution containing scandium ions and bringing this acid solution into contact with the above scandium recovering resin for an hour or more. The contact for an hour or more is carried out by (a) adding the above scandium recovering resin to the above acid solution and stirring and mixing the obtained mixture for an hour or more, or (b) applying the above acid solution to a resin tower filled with the above scandium recovering resin to bring the above acid solution into contact with the above scandium recovering resin. Because of this, scandium ions can be selectively adsorbed on the scandium recovering resin.

In order to raise the adsorption rate of scandium ions, incidentally, it is preferred that the acid solution and the scandium recovering resin be brought into contact with each other until reaching adsorption equilibrium. However, a long period of time is required to reach adsorption equilibrium. Therefore, contact of an acid solution with a scandium recovering resin until reaching adsorption equilibrium can influence operation efficiency. It is preferred, therefore, that the contact time of the acid solution and the scandium recovering resin be from an hour or more to five hours or less. When the contact time is less than an hour, there is a possibility that scandium cannot be suitably recovered. Even when the contact time is more than five hours, a significant increase in the amount of scandium recovered is not expected and the operation efficiency can be influenced.

The form of the resin tower is not particularly limited as long as an acid solution can be brought into contact with a scandium recovering resin for an hour or more, and the one in the form of a thin long cylinder is generally used.

Next, the recovery of scandium ions adsorbed on a scandium recovering resin to an eluent will be described. This recovery is carried out by (a) collecting a scandium recovering resin, adding the collected scandium recovering resin to an eluent in which the pH is adjusted to be lower than that of the above acid solution, and stirring and mixing the obtained mixture, or (b) applying the eluent to the above resin tower to bring the resin into contact with the eluent. At this time, scandium ions can be also concentrated by changing the amount or applying speed of the eluent.

EXAMPLES

The present invention will now be described in more detail by way of examples. It should be noted, however, that the present invention is not restricted to these descriptions.

Preparation of Scandium Recovering Resin

[Synthesis of Amide Derivatives]

As an example of scandium extraction agents comprising an amide or an amide derivative, a glycine amide derivative represented by the above general formula (I) was synthesized, that is, N,N-di(2-ethylhexyl)acetamide-2-glycine (hereinafter, referred to as "D2EHAG"), into which two 2-ethylhexyl groups were introduced.

D2EHAG was synthesized as follows. First, as shown in the following reaction formula (II), 2.41 g (0.1 mol) of commercially available di(2-ethylhexyl)amine and 1.01 g (0.1 mol) of triethylamine were collected. These were dissolved by adding chloroform, and successively stirred with the temperature maintained with an ice bath, and 13.5 g (0.12 mol) of 2-chloroacetyl chloride was slowly added by drops thereto. After completion of the addition by drops, the obtained mixture was stirred at room temperature for three hours. After completion of stirring, the mixture was washed with 1 mol/l hydrochloric acid once, and then washed with ion exchanged water a few times, and the chloroform phase was collected.

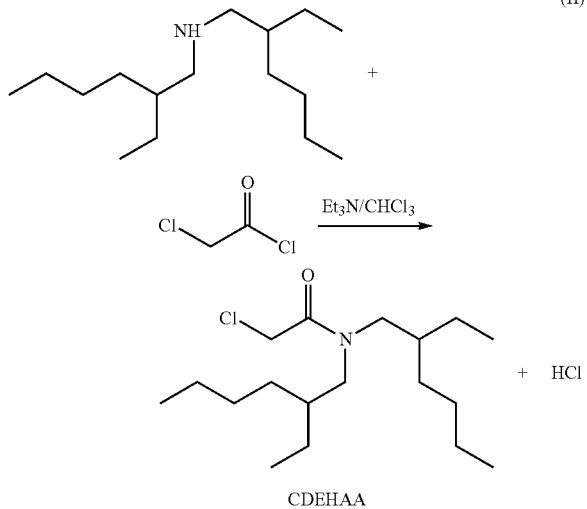

CDEHAA

Next, anhydrous sodium sulfate was added in a suitable amount (approximately 10 to 20 g) for dehydration, followed by filtration under reduced pressure, and the solvent was distilled off with an evaporator to obtain 29.1 g of yellow liquid. When the structure of this yellow liquid (reaction product) was identified using a nuclear magnetic resonance spectrometer (NMR), the above yellow liquid was confirmed to be 2-chloro-N,N-di(2-ethylhexyl)acetamide (hereinafter referred to as "CDEHAA"). The percent yield of CDEHAA was 85% relative to di(2-ethylhexyl)amine, a raw material.

Next, as shown in the following reaction formula (III), 8.0 g (0.2 mol) of sodium hydroxide was dissolved by adding methanol, and 15.01 g (0.2 mol) of glycine was further added thereto. While stirring the obtained solution at room temperature, 12.72 g (0.04 mol) of the above CDEHAA was slowly added by drops thereto. After completion of the addition by drops, the obtained mixture was stirred for 15 hours with the temperature maintained at 60° C. After completion of stirring, the solvent in the reaction liquid was distilled off with an evaporator, and the residue was dissolved by adding chloroform. To this solution, 1 mol/l sulfuric acid was added for acidification to about pH 1 to 5, followed by washing with ion exchanged water a few times, and the chloroform phase was collected.

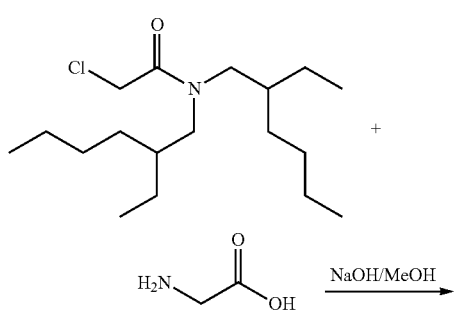

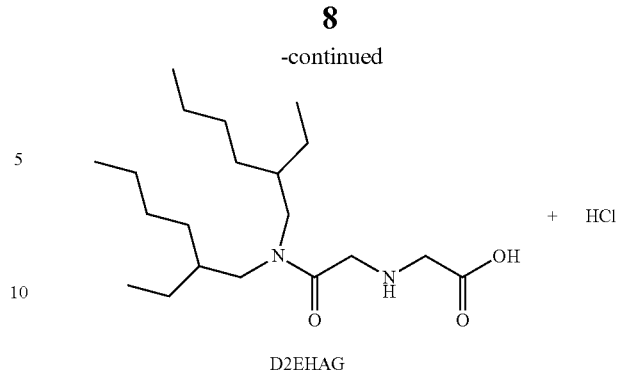

D2EHAG

To this chloroform phase, anhydrous magnesium sulfate was added in a suitable amount for dehydration, followed by filtration. The solvent was removed under reduced pressure again to obtain 12.5 g of yellow paste. The percent yield based on the amount of the above CDEHAA was 87%. When the structure of the yellow paste was identified by NMR and elemental analysis, the paste was confirmed to be D2EHAG. The amide derivative to be impregnated into a resin was obtained by performing the above steps.

[Impregnation of Amide Derivative into Resin]

In 100 ml of toluene, 30 g of the above amide derivative was dissolved to obtain a dilute solution of the amide derivative in toluene. To this liquid, 30 g of porous acrylic ester polymer resin (Product name: AMBERLITE XAD-7HP, manufactured by The Dow Chemical company) was added to impregnate an extraction agent into the resin. After this, with the temperature maintained at 60° C., toluene was distilled off under reduced pressure and D2EHAG was impregnated to obtain a scandium recovering resin (impregnation resin).

Acquisition of Acid Solution

As an acid solution containing scandium, the one produced according to a known technique was used. Specifically, a nickel oxide mineral was mixed with a sulfuric acid solution, and the obtained mixture was charged into a pressure device and heated to 240 to 250° C. to obtain a leach slurry. After this, slaked lime was added to the leach slurry for neutralization, and a sulfidizing agent was then added to a post-neutralization solution to remove nickel, cobalt, zinc and the like from the post-neutralization solution. The post-neutralization solution, after nickel and the like were removed, was used as an acid solution.

Table 1 shows the composition of the acid solution. The pH of the acid solution is 4.0. The pH was adjusted using an aqueous solution of sodium hydroxide and an aqueous solution of sulfuric acid.

TABLE 1

| COMPOSITION OF ACID SOLUTION CONTAINED METALS (mg/l) | | | | | |
|---|---|---|---|---|---|
| Mg | Mn | Fe | Al | Ca | Sc |
| 6300 | 2500 | 1000 | 2900 | 240 | 11 |

Nickel and cobalt contained in an acid solution are not substantially adsorbed on the scandium recovering resin involved in the present invention. In this example, therefore, sulfuric acid is mixed with a nickel oxide mineral to leach nickel, and a solution in which nickel and the like are removed from a leachate is used as an acid solution. However, even when the leachate itself, in which nickel and the like are leached by mixing sulfuric acid with a nickel oxide mineral, i.e. a liquid in which nickel and the like are not removed, is used as an acid solution, scandium can be suitably recovered.

Examples and Comparative Examples

Adsorption of Scandium

TABLE 2

CONTACT TIME OF ACID SOLUTION AND SCANDIUM RETRIEVAL RESIN

|  | CONTACT TIME |
| --- | --- |
| Example 1 | 5 hours |
| Example 2 | 3 hours |
| Example 3 | 1 hours |
| Comparative Example 1 | 30 minutes |
| Comparative Example 2 | 10 minutes |
| Comparative Example 3 | 5 minutes |

First, 1 g of the above scandium recovering resin was added to 50 ml of the above acid solution. After this, the mixture of the acid solution and the scandium recovering resin was stirred and mixed for times shown in Table 2 to adsorb scandium ions contained in the acid solution on the scandium recovering resin. When this adsorption was carried out, crud generation was not observed.

After stirring and mixing, the resin and the aqueous phase were obtained by solid-liquid separation using a filtering flask, a Buchner funnel and 5C filter paper.
[Evaluation]

The concentrations of metal ions contained in the above aqueous phase were analyzed by ICP emission analysis. The results are shown in Table 3 and FIG. 1.

TABLE 3

|  | STIRRING AND MIXING TIME | CONTAINED METALS (mg/l) | | | | | |
| --- | --- | --- | --- | --- | --- | --- | --- |
|  |  | Mg | Mn | Fe | Al | Ca | Sc |
| Example 1 | 5 hours | 6200 | 2500 | 930 | 2500 | 240 | 1 |
| Example 2 | 3 hours | 6200 | 2500 | 930 | 2500 | 240 | 2 |
| Example 3 | 1 hours | 6100 | 2500 | 930 | 2600 | 230 | 3 |
| Comparative Example 1 | 30 minutes | 6100 | 2400 | 920 | 2600 | 230 | 4 |
| Comparative Example 2 | 10 minutes | 6000 | 2500 | 940 | 2700 | 230 | 6 |
| Comparative Example 3 | 5 minutes | 6200 | 2400 | 950 | 2700 | 230 | 7 |

From Table 3 and FIG. 1, it turns out that although the concentrations of impurity components other than scandium hardly change over time, the concentration of scandium contained in the amount of only about one hundredth to one thousandth of the impurity components declines over time and scandium is adsorbed on the impregnation resin of the present invention. When the contact time of an acid solution and a scandium recovering resin is more than 5 hours, the concentrations of metal ions contained in an aqueous phase are expected to be less than 1 mg/l, their lower limits of analysis. However, considering industrial practicality, it is believed that the sufficient contact time is from an hour or more to 5 hours or less.

The above results confirmed that by bringing a resin impregnated with D2EHAG into contact with a liquid containing scandium for an hour or more, scandium, 70% or more of the amount contained in the original liquid, could be recovered in a state in which other impurity metals were hardly adsorbed and sediment such as crud was not formed, which hinders operations.

The invention claimed is:

1. A method for recovering scandium in which an acid solution containing calcium, magnesium and scandium is brought into contact with a resin impregnated with an amide derivative represented by formula (I) for an hour or more,

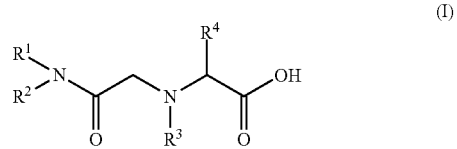

(I)

wherein, $R^1$ and $R^2$ each represent the same or different straight or branched alkyl group;

$R^3$ represents a hydrogen atom or an alkyl group; and $R^4$ represents a hydrogen atom, glycine, histidine, lysine or an aspartic acid which is bound to an α carbon as an amino acid.

2. The method for recovering scandium according to claim 1, wherein the acid solution is a solution in which nickel is leached by mixing sulfuric acid with a nickel oxide mineral.

* * * * *